(12) United States Patent
Earl et al.

(10) Patent No.: US 10,310,879 B2
(45) Date of Patent: Jun. 4, 2019

(54) PARAVIRTUALIZED VIRTUAL GPU

(75) Inventors: William J. Earl, Boulder Creek, CA (US); Kevin J. Kranzusch, Los Gatos, CA (US); Satya Kiran Popuri, Santa Clara, CA (US); Christopher W. Johnson, Saratoga, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1661 days.

(21) Appl. No.: 13/270,082

(22) Filed: Oct. 10, 2011

(65) Prior Publication Data
US 2013/0091500 A1    Apr. 11, 2013

(51) Int. Cl.
| G06F 3/00 | (2006.01) |
| G06F 9/44 | (2018.01) |
| G06F 9/46 | (2006.01) |
| G06F 13/00 | (2006.01) |
| G06F 9/455 | (2018.01) |

(52) U.S. Cl.
CPC ........ *G06F 9/4555* (2013.01); *G06F 9/45558* (2013.01); *G06F 2009/45579* (2013.01)

(58) Field of Classification Search
USPC ....................................................... 719/324
See application file for complete search history.

(56) References Cited

U.S. PATENT DOCUMENTS

| 7,434,166 | B2* | 10/2008 | Acharya et al. ............... 715/740 |
| 7,616,207 | B1* | 11/2009 | Diard ........................ G06T 1/20 345/502 |
| 8,031,198 | B1 | 10/2011 | Smith et al. |
| 8,484,392 | B2* | 7/2013 | Manula et al. ................. 710/56 |
| 8,484,405 | B2* | 7/2013 | Mashtizadeh et al. ........... 711/6 |
| 2006/0130060 | A1* | 6/2006 | Anderson et al. ................ 718/1 |
| 2006/0146057 | A1* | 7/2006 | Blythe .......................... 345/506 |

(Continued)

FOREIGN PATENT DOCUMENTS

| CN | 1797345 A | 7/2006 |
| CN | 102147722 A | 8/2011 |

OTHER PUBLICATIONS

Gupta, Vishakha et al., "GViM: GPU-accelerated Virtual Machines," Proceedings of the 3rd ACM Workshop on System-level Virtualization for High Performance Computing. ACM 2009. pp. 17-24.

(Continued)

*Primary Examiner* — Diem K Cao
(74) *Attorney, Agent, or Firm* — Artegis Law Group, LLP (57) ABSTRACT

An embodiment of the invention sets forth a primary processing unit, a secondary processing unit coupled to the primary processing unit and accessible via a plurality of channels and a plurality of guest virtual machines executing on the primary processing unit. Each guest virtual machine includes a driver associated with the secondary processing unit, and a privileged virtual machine executing on the primary processing unit and configured to allocate a different set of channels of the plurality of channels to each of the drivers included in the guest virtual machines, where a first set of channels allocated to a first driver enables the first driver to access the secondary processing unit without conflicting with any of the other and with minimal performance overhead by directly accessing the secondary processing unit channels.

21 Claims, 6 Drawing Sheets

(56) References Cited

U.S. PATENT DOCUMENTS

| | | | |
|---|---|---|---|
| 2006/0174087 A1* | 8/2006 | Hashimoto et al. | 711/173 |
| 2010/0115510 A1 | 5/2010 | Ford et al. | |
| 2010/0262722 A1 | 10/2010 | Vauthier et al. | |
| 2011/0010721 A1 | 1/2011 | Gupta et al. | |
| 2011/0050712 A1 | 3/2011 | Jackson | |
| 2011/0134111 A1 | 6/2011 | Stone | |
| 2012/0081355 A1* | 4/2012 | Post et al. | 345/419 |
| 2012/0265920 A1* | 10/2012 | Baron | 711/6 |
| 2013/0160013 A1* | 6/2013 | Pires et al. | 718/1 |

OTHER PUBLICATIONS

Kato, Shinpei et al., "Operating Systems Challenges for GPU Resource Management," Proc. of the International Workshop on Operating Systems Platforms for Embedded Real-Time Applications. 2011. pp. 23-32.

Keir Fraser, Steven H. et al., "Safe Hardware Access with the Xen Virtual Machine Monitor," In 1st Workshop on Operating System and Architectural Support for the on demand IT Infrastructure OASIS. 2004.

\* cited by examiner

PARAVIRTUALIZED VIRTUAL GPU

BACKGROUND OF THE INVENTION

Field of the Invention

The present invention generally relates to a virtualized computer architecture, and, more specifically, to a paravirtualized virtual GPU.

Description of the Related Art

Computer virtualization is a technique that involves encapsulating a physical computing machine platform into a virtual machine that is executed under the control of virtualization software on a hardware computing platform, or "host." A virtual machine has both virtual system hardware and guest operating system software. In typical virtualized systems, any physical hardware resources included in the system are exposed to the virtual machine via emulation modules. Emulation modules allow for device functionality that was designed for single use to extend to a model which allows for multiple use. The For example, for a virtual machine to interact with a hardware input device, such as mouse, a software emulation module that exposes the operations of the mouse need to be provided. virtual machine then interacts with the mouse via the software emulation module.

For simple devices that use common interfaces and low performance needs, such as a mouse or a keyboard, the software emulation model is effective. However, accessing more complex devices that have more comprehensive interfaces and higher performance needs, such as a graphics processing unit (GPU), via a software emulation model in a virtualized system yields two major problems. First, because a GPU is a highly complicated processing unit, providing a software emulation module that is comprehensive and that exposes the large range of functionality provided by the GPU is a very difficult task. Therefore, current software emulation modules that attempt to expose all of the functionalities of the GPU are lacking such that applications running in a virtual machine that consume the GPU do not run optimally, if at all. Second, because the GPU interface is more complex and performance critical, the inefficiencies of the abstraction often generate bottlenecks and inefficiencies.

One solution to the inefficiencies described above is to provide an independent GPU for each virtual machine executing on the host. Such a solution, however, is extremely expensive to implement and is not scalable. Therefore, such a solution cannot be efficiently implemented across a wide variety of consumers who need to access a GPU from within a virtual machine.

Accordingly, what is needed in the art is a system and method for efficiently sharing a single GPU across multiple users or virtual machines without having to scale up the hardware.

SUMMARY OF THE INVENTION

One embodiment of the present invention sets forth a computer system, comprising a primary processing unit, a secondary processing unit that is coupled to the primary processing unit and accessible via a plurality of assignable interfaces, a plurality of guest virtual machines executing on the primary processing unit, wherein each guest virtual machine includes a driver associated with the secondary processing unit, and a privileged virtual machine executing on the primary processing unit and configured to allocate a different set of assignable interfaces included in the plurality of assignable interfaces to each of the drivers included in the plurality of guest virtual machines, wherein a first set of assignable interfaces allocated to a first driver included in a first guest virtual machine enables the first driver to access the secondary processing unit without conflicting with any of the other drivers included in the plurality of guest virtual machines.

One advantage of the techniques described herein is that a guest GPU driver executing in a guest virtual machine is able to directly harness at least a portion of the processing capabilities of the GPU via an assigned set of interfaces. Having such direct access increases the performance of a system where multiple guest VMs are vying for access to the GPU, as the virtualization layer performs minimal intervention in setting up and controlling the access for the guest VMs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
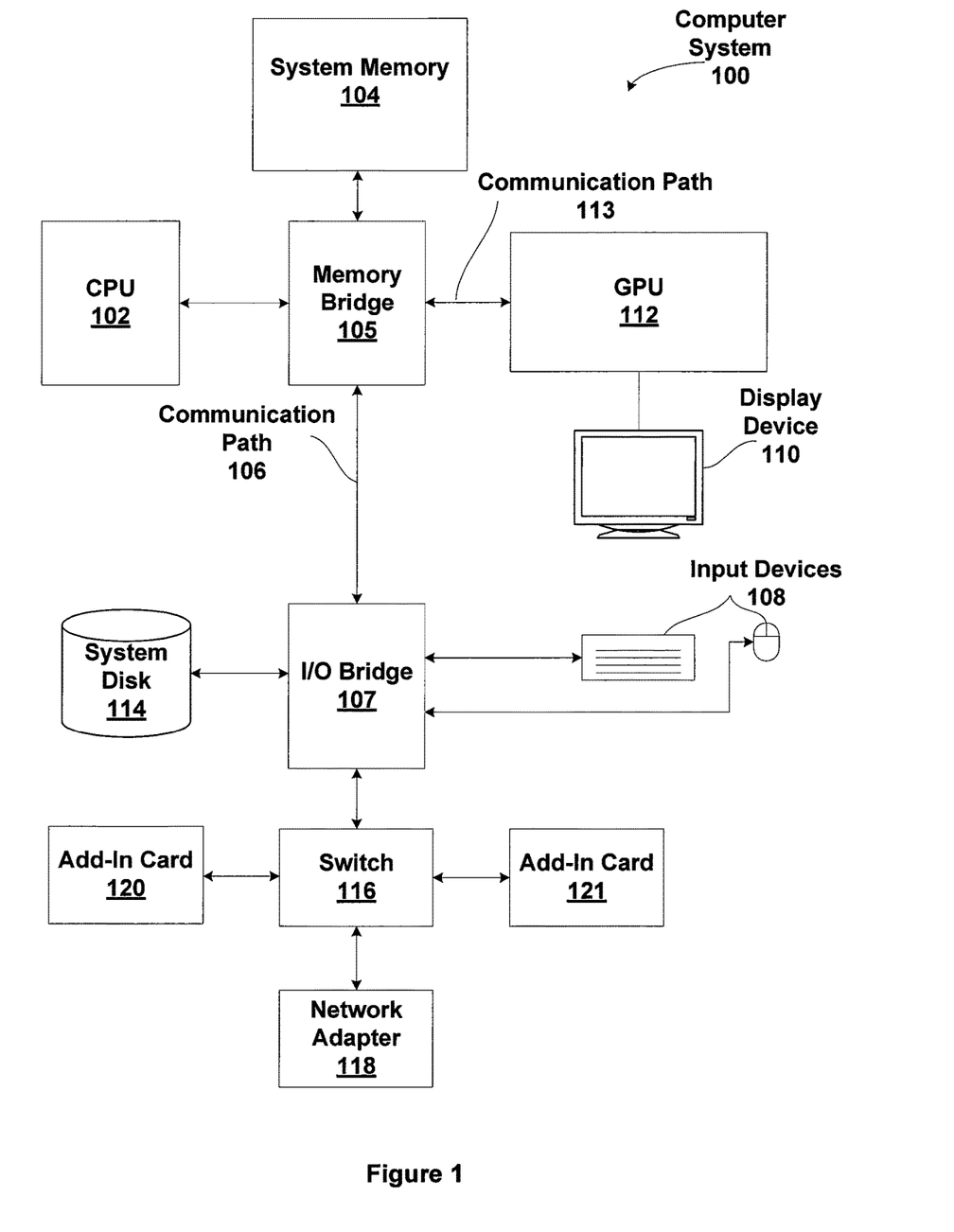
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A GPU 112 is coupled to memory bridge 105 via a bus or other communication path 113 (e.g., a PCI Express, Accelerated Graphics Port, or HyperTransport link); in one embodiment GPU 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the GPU 112 incorporates circuitry optimized for graphics and video processing, including, for example, video output circuitry, and constitutes a graphics processing unit (GPU). In another embodiment, the GPU 112 incorporates circuitry optimized for general purpose processing, while preserving the underlying computational architecture, described in greater detail herein. In yet another embodiment, the GPU 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of GPUs 112, may be modified as desired. For instance, in some embodiments, system memory 104 is connected to CPU 102 directly rather than through a bridge, and other devices communicate with system memory 104 via memory bridge 105 and CPU 102. In other alternative topologies, GPU 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more GPUs 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

In one embodiment, the GPU 112 includes one or more parallel processing units (PPUs) (not shown), each of which is coupled to a local parallel processing (PP) memory (also not shown). In general, a GPU includes a number U of PPUs, where U≥1. PPUs and parallel processing memories may be implemented using one or more integrated circuit devices, such as programmable processors, application specific integrated circuits (ASICs), or memory devices, or in any other technically feasible fashion. In some embodiments, some or all of PPUs in GPU 112 are graphics processors with rendering pipelines that can be configured to perform various tasks related to generating pixel data from graphics data supplied by CPU 102 and/or system memory 104 via memory bridge 105 and bus 113, interacting with local parallel processing memory (which can be used as graphics memory including, e.g., a conventional frame buffer) to store and update pixel data, delivering pixel data to display device 110, and the like. In some embodiments, GPU 112 may include one or more PPUs that operate as graphics processors and one or more other PPUs that are used for general-purpose computations. The PPUs may be identical or different, and each PPU may have its own dedicated parallel processing memory device(s) or no dedicated parallel processing memory device(s). One or more PPUs may output data to display device 110 or each PPU may output data to one or more display devices 110.

In operation, CPU 102 is the master processor of computer system 100, controlling and coordinating operations of other system components. In particular, CPU 102 issues commands that control the operation of GPU 112. In some embodiments, CPU 102 writes a stream of commands for the GPU 112 to a command buffer that may be located in system memory 104, parallel processing memory 204, or another storage location accessible to both CPU 102 and GPU 112. GPU 202 reads the command stream from the command buffer and then executes commands asynchronously relative to the operation of CPU 102.

Figure 2:
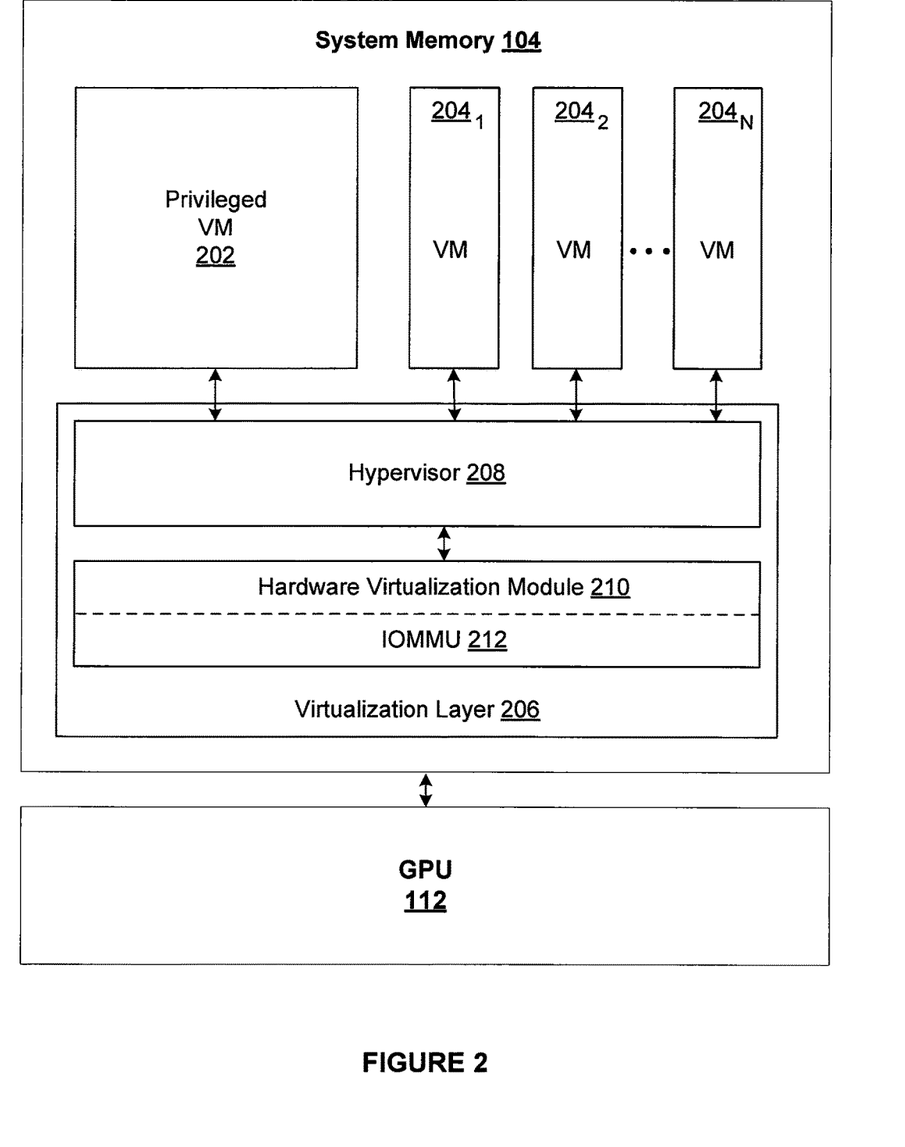
FIG. 2 is a block diagram that illustrates a virtualized computation environment executing within the computer system of FIG. 1, according to one embodiment of the present invention.

FIG. 2 is a block diagram that illustrates a virtualized computation environment executing within the computer system 100 of FIG. 1, according to one embodiment of the present invention. As shown, the system memory 104 includes a privileged virtual machine (VM) 202, a set of guest virtual machines 204 and a virtualization layer 206.

The virtualization layer 206 includes a hypervisor 208, a hardware virtualization module 210 and an input/output memory management unit (IOMMU) 212. The hypervisor 208 is a system-level software module that allows multiple guest VMs 204 to run concurrently within the computer system 100. The hypervisor 208 executes on top of the hardware virtualization module 210 and the IOMMU 212. The hardware virtualization module 210 is configured to support the sharing of the hardware resources, such as the CPU 102, within the computer system 100. The IOMMU 212 is a memory management unit that connects a DMA-capable I/O bus to system memory 104 and is configured to map device-visible virtual addresses to physical addresses. In operation, by consuming the services provided by the hardware virtualization module 210 and the IOMMU 212, the hypervisor 208 emulates a separate physical address space for each guest VM 204, and is configured to lock ("pin") virtual machine pages into physical memory, such as the system memory 104, to support direct memory access (DMA) between an I/O device and a virtual machine page.

In one embodiment, the IOMMU 212 included in the virtualization layer 206 is not a necessary component of the invention.

The privileged VM 202 provides I/O emulation software and a resource manager that allows the guest VMs 204 access to the hardware resources within the computer system 100 via the hypervisor 208. The following discussion describes in greater detail the operations of the privileged VM 202 in providing access to the GPU 112 and the display device 110 to the guest VMs 204. In the following discussion, the "host operating system" is the operating system for the privileged VM 202 and the "guest operating system" is the operating system for a guest VM 204. The types of operating system may vary across the guest VMs 204 and privileged VM 202. Examples of a guest operating system include any of the well-known commodity operating systems, such as Microsoft Windows, Linux, and the like.

Figure 3:
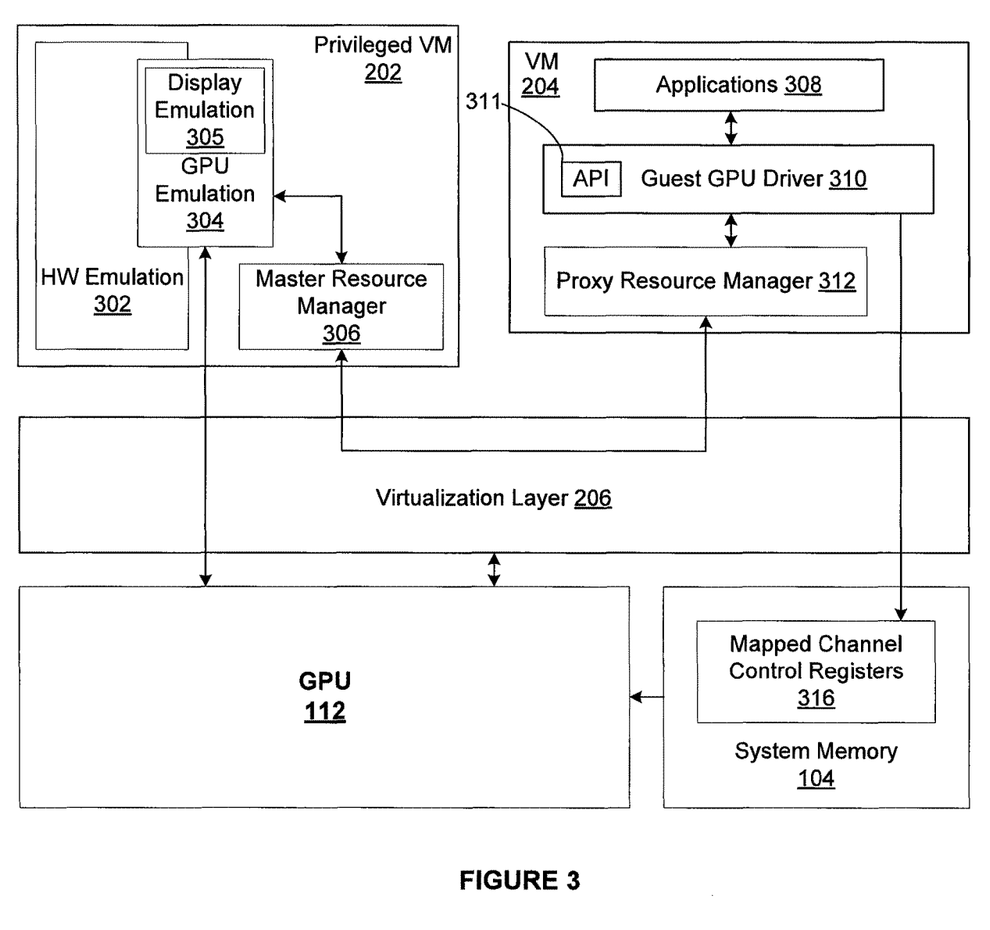
FIG. 3 is a more detailed view of the privileged VM and the guest VM of FIG. 2, according to one embodiment of the present invention.

FIG. 3 is a more detailed view of the privileged VM 202 and the guest VM 204 of FIG. 2, according to one embodiment of the present invention. As shown, the privileged VM 202 includes hardware emulation software 302, a GPU emulation module 304 plugged into the hardware emulation software 302 that includes a display emulation module 305, and a master resource manager (RM) 306. As also shown, the guest VM 204 includes an application 308, a guest GPU driver 310 and a proxy RM 312.

The application 308 is a software module that, when executed, transmits one or more instructions to be processed by the GPU 112. The application 308 consumes one or more application program interfaces (APIs), such as the API 311, exposed by the guest GPU driver 310 to control the operation of the GPU 112. The guest GPU driver 310 is a driver associated with the GPU 112 that is unaware that the application 308 or the guest GPU driver 310 is executing within a virtual machine and not directly within the execution environment of the CPU 102.

In operation, when the application 308 first transmits initialization instructions to the guest GPU driver 310 that require the access of different components or the processing capabilities of the GPU 112, the guest GPU driver 310 transmits a request to what the guest GPU driver 310 assumes is the operating system executing on the CPU 102 for setting up access to the GPU 112. The request transmitted by the guest GPU driver 310 is trapped by the GPU emulation module 304.

The proxy resource manager 312 provides a communication channel between the guest GPU driver 310 and the privileged VM 202. Importantly, the proxy resource manager 312 is aware that the application 308, the guest GPU driver 310 and the proxy resource manager are executing within a virtual machine. Therefore, the proxy resource manager 312 routes initialization commands that require access to hardware resources within the computer system 100 to the privileged VM 202 for handling. In one embodiment, the proxy resource manager 312 communicates within the privileged VM 202 via remote procedure calls (RPCs). The RPC communication path is implemented on virtual hardware interfaces and shared memory, thus allowing the RPC path to be independent of the type of hypervisor 208 included in the virtualization layer 206.

In operation, the request for setting up access to the GPU 112 is routed by the proxy resource manager 312 to the GPU emulation module 304, which then transmits the request to master resource manager 306 included in the privileged VM 202. The master resource manager 306 is a software module that manages the access and interactions between the different guest VMs 304 and the hardware resources included in the computer system 100. More specifically, the master resource manager 306 receives access requests for hardware resources, such as the input devices 108, GPU 112, etc., from the guest VMs 204 and determines the mechanism for providing access to those hardware resources to the guest VMs.

Upon receiving a request for setting up access to the GPU 112, the master resource manager 306 allocates a channel associated with the GPU 112 to the guest VM 204. A channel is a hardware construct that allows applications, such as application 308, to directly access the GPU 112 when transmitting commands for execution within the GPU 112. Each channel corresponds to a different set of channel control registers that is programmed to populate the corresponding channel. The GPU 112 is associated with a predetermined number of assigned interfaces (referred to herein as "channels"), and the master resource manager 306 allocates a pre-configured number of those channels to the guest VM 204. In one embodiment, the number and the particular channels allocated to a guest VM 204 is randomly determined by the master resource manager 306.

Once a channel is allocated to the guest VM 204 by the master resource manager 306, the GPU emulation module 304 included in the hardware emulation software 302 is notified. The GPU emulation module 304 is a paravirtualized model of the GPU 112 which emulates portions of the GPU 112, such as certain configuration information registers, and provides direct access to other portions of the GPU 112 to the guest VMs 204. Emulated portions of the GPU 112 are accessed by the guest VMs 204 via the GPU emulation module 304, and the directly accessible portions of the GPU 112, such as the channels, are accessed by the guest VMs 204 directly once the setup for that access is completed by the privileged VM 202. In one embodiment, the GPU emulation module 304 is coupled to the hardware emulation software 302 via a plugin API and is, therefore, independent of the type of hypervisor 308.

When the GPU emulation module 304 is notified that a channel has been allocated to the guest VM 204, the GPU emulation module 304 maps the set of control registers 316 corresponding to the allocated channel to a memory space accessible by the guest VM 204. The GPU emulation module 304 provides address space isolation for the different guest VMs 204 such that the mapped memory space is separate for each guest VM 204. Therefore, a guest VM 204 cannot access the memory space mapped for a different guest VM 204, thereby never causing a conflict on a channel allocated to the different guest VM 204. To achieve such isolation, the GPU emulation module 304 utilizes the virtualization layer 206 to lock VM addresses and translate the locked physical addresses to physical addresses within the system memory 104. The translated addresses are then mapped into the address space associated with the GPU 112.

Once the set of control registers 316 corresponding to the allocated channel are mapped, the proxy resource manager 312 is notified that the channel has been allocated to the guest GPU driver 310, which, in turn, transmits a notification to the guest GPU driver 310 indicating that the channel has been allocated. The guest GPU driver 310 then maps the mapped memory space into the application 308.

Once the access to the GPU 112 is set up as described above, the guest GPU driver 310, on command of the application 308, can access the GPU 112 directly by manipulating the set of control registers 316 associated with the allocated channel. More specifically, the guest GPU driver 310 populates a region of memory (referred to herein as a "command buffer") with commands to be transmitted to the GPU 112. The guest GPU driver 310 then programs the set of control registers 316 that were mapped into the memory space accessible by the guest VM 204 to indicate the beginning and ending memory addresses of the populated command buffer. Once the ending memory address is programmed into the set of control registers, the GPU 112 automatically begins fetching the commands included in the command buffer for execution. Importantly, at this stage, no trapping or emulation operations are performed.

Referring back to the GPU emulation module 304, which, as described above, emulates portions of the GPU 112, such as configuration registers, Peripheral Component Interconnect Express (PCIe) bus registers, events/interrupts. The guest VMs 204, more specifically, the guest GPU driver 310, access those emulated resources via the GPU emulation module 304 and do not access the GPU 112 directly. With respect to events raised by the GPU 112, such as channel faults and completion notices, the guest GPU driver 310 indicates to the GPU emulation module 304 the events for which the guest GPU driver 310 would like to register. Each time the GPU 112 raises an event, the GPU emulation module 304 determines whether a guest VM 204 has registered for that particular event. If so, the GPU emulation module 304 forwards a notification to the guest GPU driver 310 included in the guest VM 204 indicating that the event was raised. In addition, the GPU emulation module 304 receives fault events resulting from GPU command processing associated with a particular channel. The GPU emulation module 304 then determines the guest VM 204 to which the channel was allocated and forwards the fault event to that guest VM 204.

In addition, the GPU emulation module 304 tracks the status of GPU virtual addresses as the addresses are remapped or destroyed. When all GPU references to a pinned guest page have been overwritten or destroyed, the guest page is unpinned. Further, the GPU emulation module 304 includes provisions for reserving resources within the computer system 100 for a given guest VM 204 such that unexpected allocation failures are avoided. Finally, the GPU emulation module 304 supports suspending and resuming a guest VM 204, possibly on a different physical system or on a different GPU, by saving the state of GPU virtual address mappings and GPU channels to system memory 104 or external storage, such as system disk 114, when suspending, and by restoring the state when resuming. After suspending the virtual machine, the GPU emulation module 304 frees GPU resources, such as allocated channels, and unpins any pinned virtual machine pages. On resuming, the GPU emulation module 304 pins and translates all mapped virtual machine addresses, and recreates the GPU virtual mappings.

When generating graphics frames for display, the guest VM 204 generates graphics frames with the assumption that the entire display device 110 is allocated to the guest VM 204. Therefore, display commands transmitted by a display driver (not shown) included in the guest VM 204 are trapped by the display emulation module 305. The trapped display commands are translated using the GPU 112 to simulate compositing, scaling, and other processing of display frames according to the actual allocation of the display device 110 to the guest VM 204.

In addition, the master resource manager 306 also partitions resources such as memory across multiple guest VMs 204. The resources are partitioned either statically or dynamically, assigned and protected to a single guest VM 204, and then given direct access (via memory address) back to the guest VM 204 for use. Such a resource, much like channels, is then available for direct protected access by the guest GPU driver 310.

Figure 4:
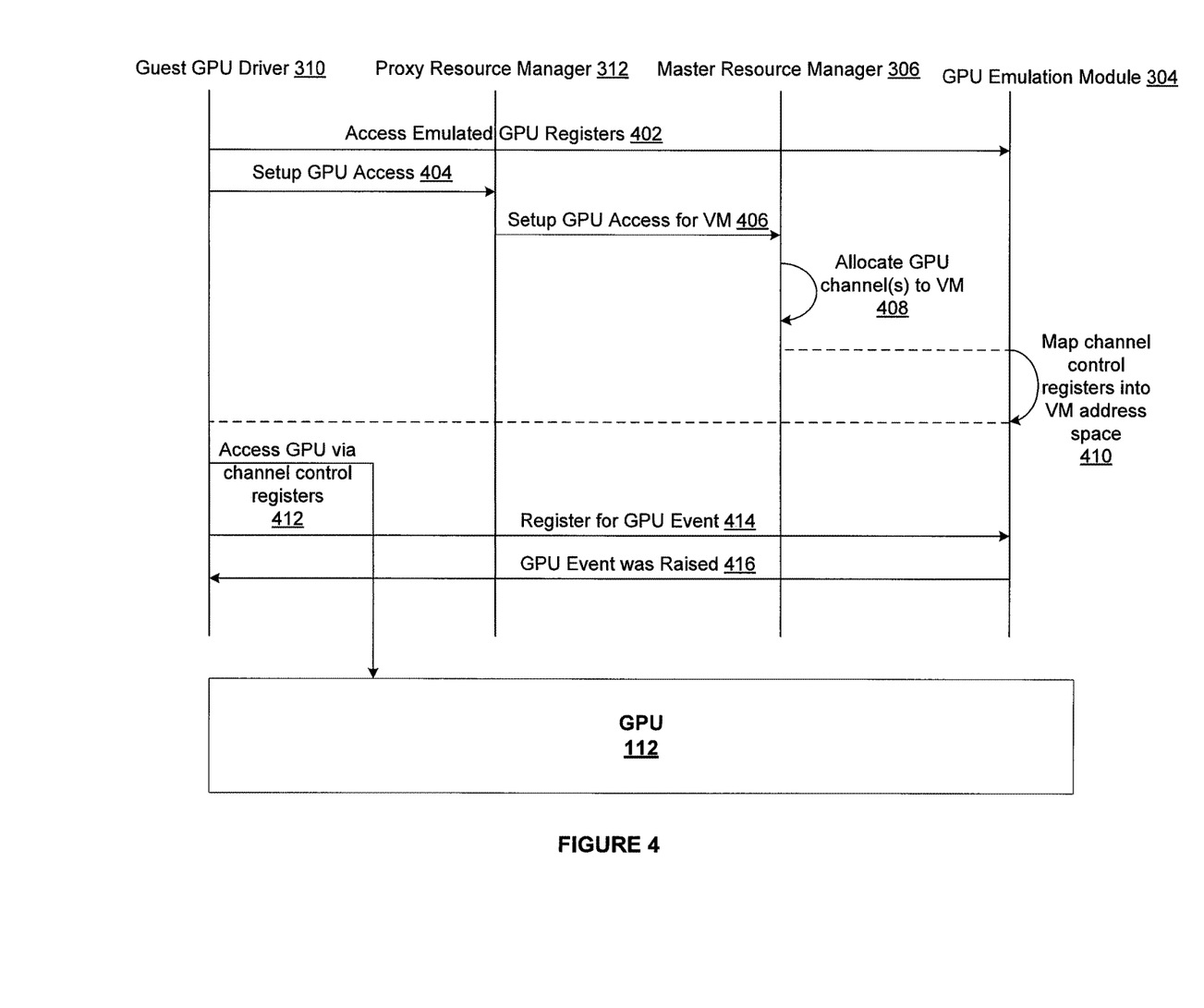
FIG. 4 is a conceptual illustration of the interactions between the privileged VM and the guest VM of FIG. 2 and the GPU of FIG. 1, according to one embodiment of the invention; and FIG. 5A

FIG. 4 is a conceptual illustration of the interactions between the privileged VM 202 and the guest VM 204 of FIG. 2 and the GPU of FIG. 1, according to one embodiment of the invention.

To access emulated resources, such as GPU configuration registers, the guest GPU driver 310, at interaction 402, transmits a request to the GPU emulation module 304. The GPU emulation module 304 communicates with the GPU 112, either upon receiving the request or beforehand, to retrieve the relevant data associated with emulated resources. In response to the request, the GPU emulation module 304 transmits the relevant data to the guest GPU driver 310.

To set up access to the GPU for executing commands, the guest GPU driver 310, at interaction 404, transmits an access request to the proxy resource manager 312. The proxy resource manager 312, at interaction 406, forwards the request to the master resource manager 306. The master resource manager 306, at operation 408, allocates at least one GPU channel associated with the GPU 112 to the guest GPU driver 310. The allocation can be made dynamically or may be statically pre-determined. The master resource manager 306 notifies the GPU emulation module 304 of the channel allocation. The GPU emulation module 304, at operation 410, then maps the set of channel control registers associated with the allocated channels into memory space accessible by the guest VM 204 that includes the guest GPU driver 310. The guest GPU driver 310 then directly accesses the GPU 112 via the set of channel control registers at operation 412 in the manner described above.

To register for events raised by the GPU 112, the request for event registration transmitted by the guest GPU driver 310, at transaction 414, is routed to the GPU emulation module 304. The GPU emulation module 304 keeps track of any events for which the guest GPU driver 310 has registered. When the GPU emulation module 304 receives an event notification from the GPU 112 for which the guest GPU driver 310 has registered, the GPU emulation module 304 forwards the event notification, at transaction 416, to the guest GPU driver 310.

Figure 5A:
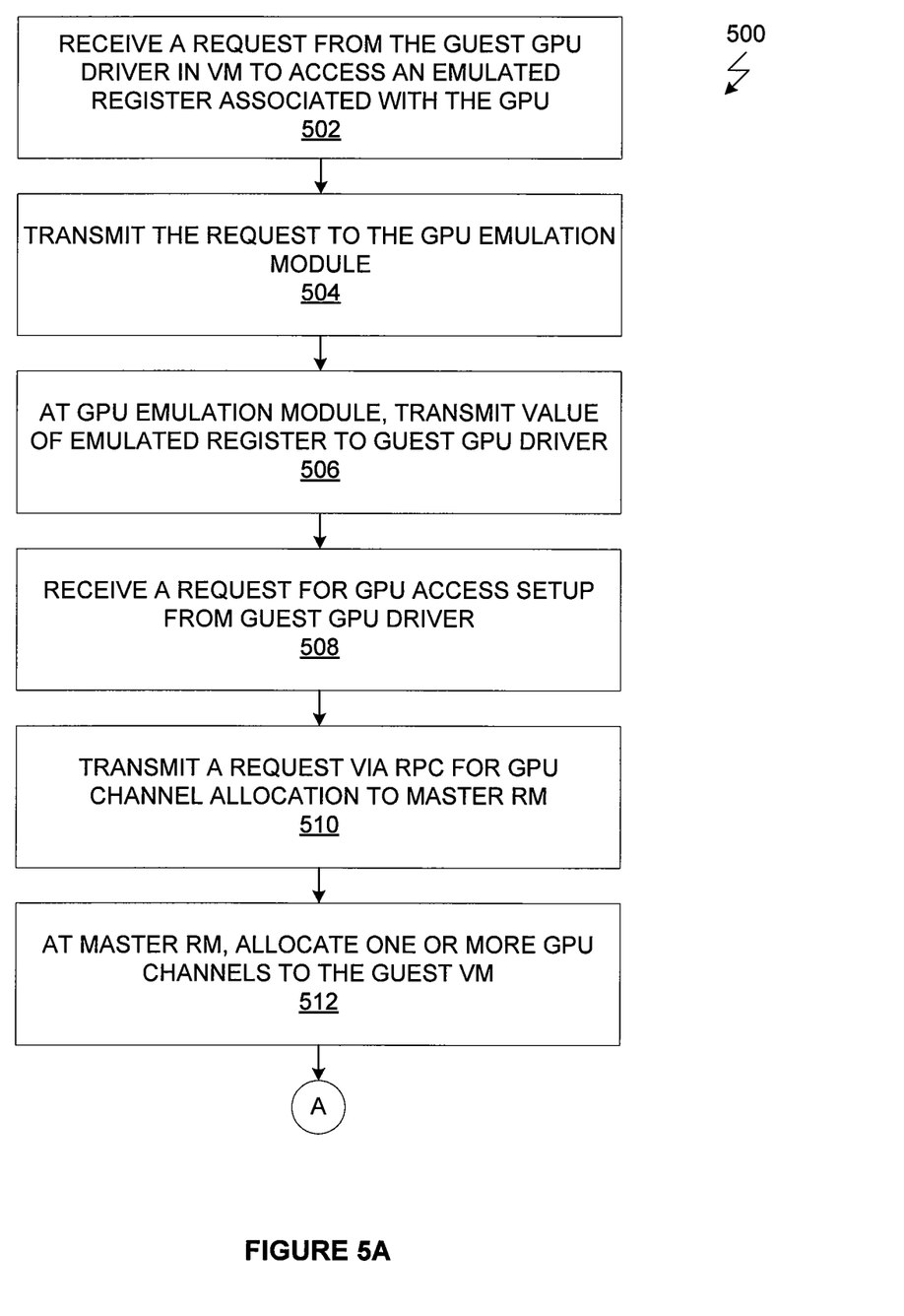
Figure 5B:
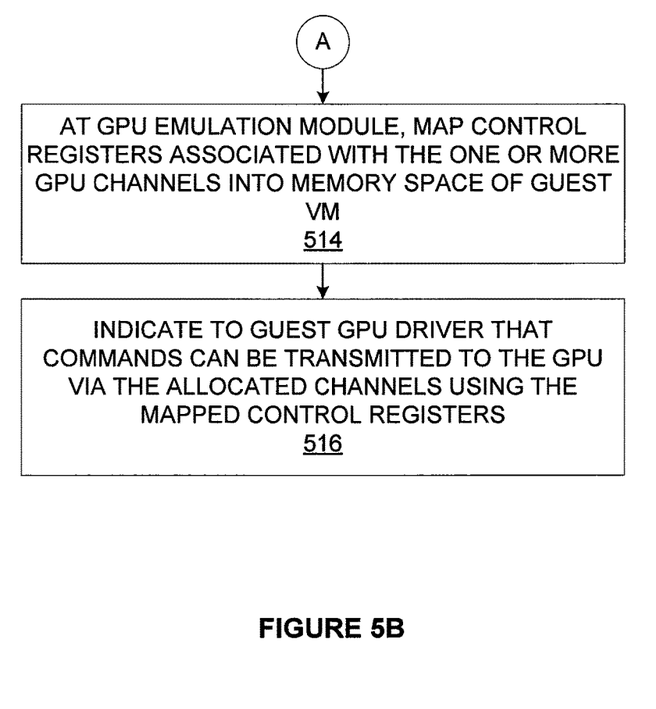
FIG. 5B is a flow diagram of method steps for enabling the guest VM to access the GPU in a paravirtualized manner, according to one embodiment of the invention.

FIG. 5 is a flow diagram of method steps for enabling the guest VM to access the GPU in a paravirtualized manner, according to one embodiment of the invention. Although the method steps are described in conjunction with FIGS. 1-3, persons skilled in the art will understand that any system configured to perform the method steps, in any order, falls within the scope of the present invention.

The method 500 begins at step 502, where the proxy resource manager 312 receives a request from the guest GPU driver 310 for access to an emulated register associated with the GPU 112. At step 504, the proxy resource manager 308 transmits the request to the GPU emulation module 304 via the master resource manager 306. At step 506, the GPU emulation module 304 transmits data associated with the emulated register to the guest GPU driver 310 via the master resource manager 306 and the proxy resource manager 312.

At step 508, the proxy resource manager 312 receives a request from the guest GPU driver 310 for setting up access to the GPU 112 for executing commands. At step 510, the proxy resource manager 312 forwards the request to the master resource manager 306 via a remote procedure call. The master resource manager 306, at step 512, allocates at least one GPU channel associated with the GPU 112 to the guest GPU driver 310. The master resource manager 306 then notifies the GPU emulation module 304 of the channel allocation. At step 514, the GPU emulation module 304 maps the set of channel control registers associated with the allocated channels into memory space accessible by the guest VM 204 that includes the guest GPU driver 310. At step 516, the proxy resource manager 312 indicates to the guest GPU driver 310 that the GPU 112 can be accessed directly, without the intervention of any other components within the system 100, via the set of channel control registers at operation 412 in the manner described above.

In such a manner, a guest GPU driver 310 executing in a guest virtual machine is able to directly harness at least a portion of the processing capabilities of the GPU 112. Having such direct access increases the performance of a system where multiple guest VMs are vying for access to the GPU 112, as the virtualization layer 206 performs minimal intervention in setting up access for the guest VMs. In addition, because the guest GPU driver 310 can directly transmit commands to the GPU 112, the amount of command translation and the compatibility issues that arise when supporting different types of GPU drivers in a virtualized environment is drastically reduced.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer system, comprising:
   a primary processing unit;
   a secondary processing unit that is coupled to the primary processing unit and accessible via a plurality of channels;
   a plurality of guest virtual machines executing on the primary processing unit, wherein each guest virtual machine includes a driver associated with the secondary processing unit; and
   a privileged virtual machine executing on the primary processing unit and configured to allocate a different set of channels included in the plurality of channels to each of the drivers included in the plurality of guest virtual machines,
   wherein a first set of channels included in the plurality of channels allocated to a first driver included in a first guest virtual machine enables the first driver to directly access the secondary processing unit without conflicting with and being protected from any of the other drivers included in the plurality of guest virtual machines, and
   wherein the first driver accesses the second processing unit by writing commands to a command buffer and communicating addresses of the commands to the secondary processing unit via the first set of channels.

2. The computer system of claim 1, wherein each guest virtual machine includes a proxy resource manager configured to communicate with the privileged virtual machine via remote procedure calls.

3. The computer system of claim 2, wherein the first guest virtual machine includes a first proxy resource manager configured to:
   transmit a request to the privileged virtual machine to set up access to the secondary processing unit for the first driver, and
   receive a communication from the privileged virtual machine that the first set of channels has been allocated to the first driver,
   wherein the privileged virtual machine maps one or more control registers associated with the first set of channels into a portion of a memory space accessible by the first driver, wherein each control register is associated with a different channel in the first set of channels, and each channel in the first set of channels is populated with commands based on the contents of the associated control register associated with the channel.

4. The computer system of claim 3, wherein the first driver accesses the second processing unit by further populating a control register associated with a first channel included in the first set of channels with at least a first memory address associated with the command buffer.

5. The computer system of claim 2, wherein the privileged virtual machine includes an emulation software module that is configured to emulate a portion of the secondary processing unit, and the proxy resource manager is configured to:
route a request to access the portion of the second processing unit from the first driver to the emulation software module, and
transmit data from the emulation software module to the first driver in response to the request.

6. The computer system of claim 2, wherein the privileged virtual machine includes an emulation software module that is notified each time an event is raised by the second processing unit, and a first proxy resource manager is configured to:
route a request to register for a first event that is to be raised by the second processing unit to the emulation software module, and
transmit a notification from the emulation software module to the first driver when the first event is raised by the second processing unit.

7. The computer system of claim 2, wherein the privileged virtual machine includes an emulation software module that is notified by the second processing unit each time a fault associated with any of the channels included in the plurality of channels occurs.

8. The computer system of claim 7, wherein a first proxy resource manager is configured to receive a notification from the emulation software module when a fault associated with a first channel included in the first set of channels occurs and to transmit the notification to the first driver.

9. The computer system of claim 1, further comprising a display, wherein each of the guest virtual machines includes a display driver configured to render display frames onto the display.

10. The computer system of claim 9, wherein the privileged virtual machine includes an emulation software module that is configured to trap a display command transmitted by a first display driver included within the first guest virtual machine that pertains to rendering a first display frame onto the display.

11. The computer system of claim 10, wherein the emulation software module is further configured to translate the display command into a different display command for rendering the first display frame in a portion of the display allocated to the first guest virtual machine.

12. The computer system of claim 1, wherein the privileged virtual machine is configured to de-allocate the first set of channels from the first driver when the first guest virtual machine is terminated.

13. A method for configuring a virtual machine executing on a primary processing unit to access a secondary processing unit, the method comprising:
receiving a first request from a driver residing within the virtual machine to set up access to the secondary processing unit;
transmitting a second request to a hardware resource manager to set up access to the secondary processing unit for the driver;
receiving a communication from the hardware resource manager that a first channel providing access to the secondary processing unit has been allocated to the driver; and
notifying the driver that the driver can transmit one or more commands directly to the secondary processing unit via the first channel,
wherein the driver writes commands to a command buffer and communicates addresses of the commands to the secondary processing unit via the first channel.

14. The method of claim 13, further comprising mapping a set of control registers associated with the first channel into a portion of a memory space accessible by the driver.

15. The method of claim 14, wherein the driver notifies a control register associated with the first channel that the one or more commands are stored in the command buffer, wherein the one or more commands stored in the command buffer are transmitted to the second processing unit via the first channel in response to the notification.

16. The method of claim 13, further comprising trapping a first display command transmitted by a display driver executing within the virtual machine for rendering a display frame onto a display, and translating the first display command into a second display command for rendering the display frame in a portion of the display allocated to the virtual machine.

17. A non-transitory computer readable medium for storing instructions that, when executed by a processor, cause the processor to configure a virtual machine executing on a primary processing unit to access a secondary processing unit, by performing the steps of:
receiving a first request from a driver residing within the virtual machine to set up access to the secondary processing unit;
transmitting a second request to a hardware resource manager to set up access to the secondary processing unit for the driver;
receiving a communication from the hardware resource manager that a first channel providing access to the secondary processing unit has been allocated to the driver; and
notifying the driver that the driver can transmit one or more commands directly to the secondary processing unit via the first channel,
wherein the driver writes commands to a command buffer and communicates addresses of the commands to the secondary processing unit via the first channel.

18. The computer readable medium of claim 17, further comprising mapping a set of control registers associated with the first channel into a portion of a memory space accessible by the driver.

19. The computer readable medium of claim 18, wherein the driver notifies a control register associated with the first channel that the one or more commands are stored in the command buffer, wherein the one or more commands stored in the command buffer are transmitted to the second processing unit via the first channel in response to the notification.

20. The computer readable medium of claim 17, further comprising trapping a first display command transmitted by a display driver executing within the virtual machine for rendering a display frame onto a display, and translating the first display command into a second display command for rendering the display frame in a portion of the display allocated to the virtual machine.

21. A non-transitory computer readable medium for storing instructions that, when executed by a processor, cause the processor to configure a virtual machine executing on a primary processing unit to access a secondary processing unit, by performing the steps of:
receiving a first request from a driver residing within the virtual machine to set up access to the secondary processing unit;

transmitting a second request to a hardware resource manager to set up access to the secondary processing unit for the driver;

receiving a communication from the hardware resource manager that a first channel providing access to the secondary processing unit has been allocated to the driver; and notifying the driver that the driver can transmit one or more commands directly to the secondary processing unit via the first channel, wherein the driver writes the one or more commands to the command buffer and notifies a control register associated with the first channel that the one or more commands are stored in the command buffer, wherein the one or more commands stored in the command buffer are transmitted to the second processing unit via the first channel in response to the notification.

* * * * *